United States Patent
Karadigudda et al.

(10) Patent No.: US 12,549,358 B2
(45) Date of Patent: *Feb. 10, 2026

(54) ENCRYPTION KEY ROTATION USING DATASET SIZE AND PREDICTED THRESHOLD TIME BASED ON DATA INGEST RATES

(71) Applicant: Dell Products L.P., Round Rock, TX (US)

(72) Inventors: Mahadev Karadigudda, San Jose, CA (US); Madhu Agrahara Gopalakrishna, Fremont, CA (US); Sankalp Suhas Taralekar, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 18/470,289

(22) Filed: Sep. 19, 2023

(65) Prior Publication Data

US 2025/0097029 A1    Mar. 20, 2025

(51) Int. Cl.
*H04L 9/08* (2006.01)
*G06N 5/022* (2023.01)
*H04L 9/14* (2006.01)

(52) U.S. Cl.
CPC .......... *H04L 9/0894* (2013.01); *G06N 5/022* (2013.01); *H04L 9/14* (2013.01)

(58) Field of Classification Search
CPC .......... H04L 9/0894; H04L 9/14; G06N 5/022
See application file for complete search history.

(56) References Cited

U.S. PATENT DOCUMENTS

| | | | |
|---|---|---|---|
| 6,091,820 | A | 7/2000 | Aziz |
| 8,284,945 | B2 | 10/2012 | Breyel |
| 9,628,274 | B1 | 4/2017 | Jenks |
| 10,073,855 | B2 * | 9/2018 | Chao ........................ G06F 9/505 |
| 10,523,434 | B1 | 12/2019 | Sharifi Mehr |
| 10,931,450 | B1 | 2/2021 | Chellappa |
| 11,075,913 | B1 | 7/2021 | Theimer |
| 2006/0291664 | A1 | 12/2006 | Suarez |
| 2015/0180656 | A1 * | 6/2015 | Rich ..................... H04L 9/0891 713/168 |
| 2016/0050272 | A1 | 2/2016 | Raduchel |
| 2017/0285978 | A1 | 10/2017 | Manasse |
| 2020/0143065 | A1 | 5/2020 | Hersans |
| 2020/0244445 | A1 | 7/2020 | Ponnusamy |
| 2021/0218548 | A1 | 7/2021 | Abraham |
| 2021/0232459 | A1 | 7/2021 | Katiyar |
| 2022/0121766 | A1 | 4/2022 | Chong |
| 2022/0180000 | A1 | 6/2022 | Sofia |
| 2022/0329422 | A1 | 10/2022 | Lin |

\* cited by examiner

*Primary Examiner* — Pramila Parthasarathy
(74) *Attorney, Agent, or Firm* — Staniford Tomita LLP

(57) ABSTRACT

Rotating encryption keys in a size-based process using data ingestion rates to predict when a threshold size to trigger key rotation will be reached such that an equal amount of data is encrypted by different encryption keys. A machine learning (ML) model is trained based on historical data of data ingestion rates in the data storage system to predict the time that the threshold will be reached. The encryption key is then rotated at that time. A time-based rotation is triggered after a defined period to automatically rotate the key if the size-based rotation is not triggered within this period.

16 Claims, 6 Drawing Sheets

ENCRYPTION KEY ROTATION USING DATASET SIZE AND PREDICTED THRESHOLD TIME BASED ON DATA INGEST RATES

TECHNICAL FIELD

Embodiments relate generally to data encryption, and more particularly to encryption key rotation using artificial intelligence/machine learning (AI/ML) techniques.

BACKGROUND OF THE INVENTION

With the increasing need to secure data access in data storage systems, it is necessary to ensure that data is secure throughout its lifecycle from on-disk storage to in-memory access. Current key-based encryption systems encode the data such that it can only be accessed or decrypted by a user with the correct encryption key. Key-based encryption can be symmetric where one secret key is used to both encode and decode the data, or asymmetric where encryption uses a public key and decryption uses a private key. The longer that a particular key is in use, the more susceptible it is to compromise due to hacking, inadvertent exposure, or other causes. Failing to regularly rotate keys can thus jeopardize large amounts of data to security vulnerabilities.

While encrypting data at rest, a storage system can get encryption keys from one of the several supported key managers. For security, these encryption keys are periodically rotated to prevent too much data from being exposed in case of key compromise. Users are typically provided options to automatically rotate keys by setting up a key rotation policy. For example, rotation periods can be set to weekly or monthly key rotation with the assumption that keys will be rotated at that frequency. To ensure consistent security, it is important for storage systems rotate its encryption keys at the defined key rotation interval. If keys are not rotated with sufficient frequency, a large amount of data may be encrypted using a single key, instead of having fractions of that data encrypted with different respective keys.

Current key rotation methods, such as time-based key rotation, may lead to uneven amounts of data being encrypted with different keys. This can be due to varying data ingest rates and deduplication rates. Some present systems employ size-based key rotation to try to accommodate varying data processing rates. Such systems, however, do not always achieve the goal of making the impact of a compromised key as similar as possible to those of other keys with respect to amounts of data exposure.

What is needed, therefore, is a system and method that keep data evenly distributed across keys so that any key compromise event impacts equal amounts of data and any processing time required to fix the issue is the same for all of the keys.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell Technologies Inc.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
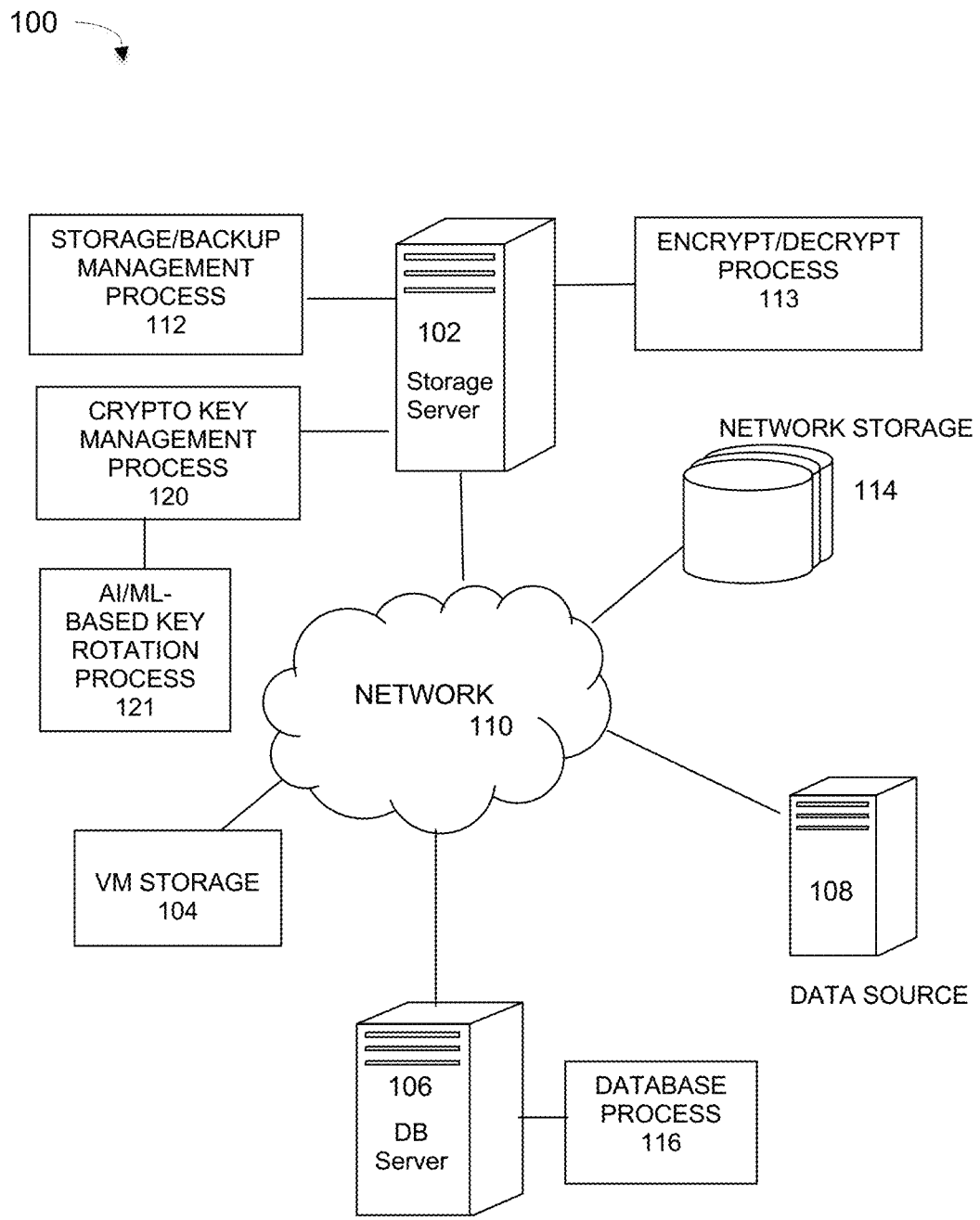
FIG. 1 is a diagram of a computing network implementing a key rotation process using data ingest rates, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments of a key management system perform data ingest rate based key rotation using AI/ML techniques to predict data ingestion rates so that each key will encrypt equal or at least similar amounts of data so that the keys control only limited amounts of data and key event processing times remain similar across keys in case of security compromises.

FIG. 1 illustrates a networked data storage system that implements one or more embodiments of a key management process using size-based key rotation methods and certain AI/ML techniques to predict when a size threshold will be reached, under some embodiments. In system 100, a storage (or backup) server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources of data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by Dell EMC Corporation. However, other similar backup and storage systems are also possible.

Data Domain is an example of a purpose-built backup appliance providing streaming deduplication that is able to ingest data at full network speeds, from multiple backup sources while providing storage efficiency.

Encryption keys used for encrypting data at rest are rotated at cadence to ensure that large amounts of data are not dependent on a single encryption key, which creates the risk of a single point of failure when securing data at rest. Data encryption key management system 100 is handled by a dedicated cryptographic key management module 120 that ensures that key rotation is handled seamlessly with ongoing data ingest and restore operations.

In an embodiment, the cryptographic key management system is used in a data storage system that implements a deduplication backup process, such as a Dell EMC Data Domain (DD) system. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

Systems such as DDFS may use the Key Management Interoperability Protocol (KMIP), which defines message formats for the manipulation of keys on a key management server. This facilitates data encryption by simplifying encryption key management. Keys may be created on a server and then retrieved. Both symmetric and asymmetric keys are supported, including the ability to sign certificates. KMIP also allows for clients to ask a server to encrypt or decrypt data, without needing direct access to the key. Under KMIP, each key has a cryptographic state. Keys are created in an initial state, and must be activated before they can be used. Keys may then be deactivated and eventually destroyed. A key may also be marked being compromised.

An encryption key (or simply "key") can become compromised due to a variety of reasons or acts. For example, a compromised key can result from the unauthorized disclosure of a key so that all data encrypted by that key could be accessed by unauthorized parties. The integrity of a key could be compromised by invalid modification or substitution so that the key could be used for the wrong purpose or for the wrong application. The key's association with the owner could be compromised so that the identity of the other party cannot be assured or the data cannot be properly decrypted. Finally, the key's association with other information can be compromised so that the key is not associated with any data or the wrong data.

Because of the vulnerability of encryption keys to such attacks or problems, it is necessary to rotate keys frequently to prevent an excess amount of data being encrypted by a single key. For example, with successful key rotations, 100 TB of data may be encrypted in chunks of 10 TB each with a different respective encryption key, whereas in the case of key rotation failure, all 100 TB may be encrypted with only one key, thus exposing the entire dataset to vulnerability rather than just one 10 TB chunk.

If a key gets compromised, the user must re-encrypt all the data associated with that compromised key. If a large amount of data (e.g., 100 TB versus 10 TB) is associated with a single compromised key, a great deal more time will be required to re-encrypt the data. The chance of security vulnerability increases in case of such a delay in re-encrypting that data, which may lead to disruptions in regular backup and restore operations. Therefore, defining and adhering to an effective key rotation policy is of great importance.

Figure 2:
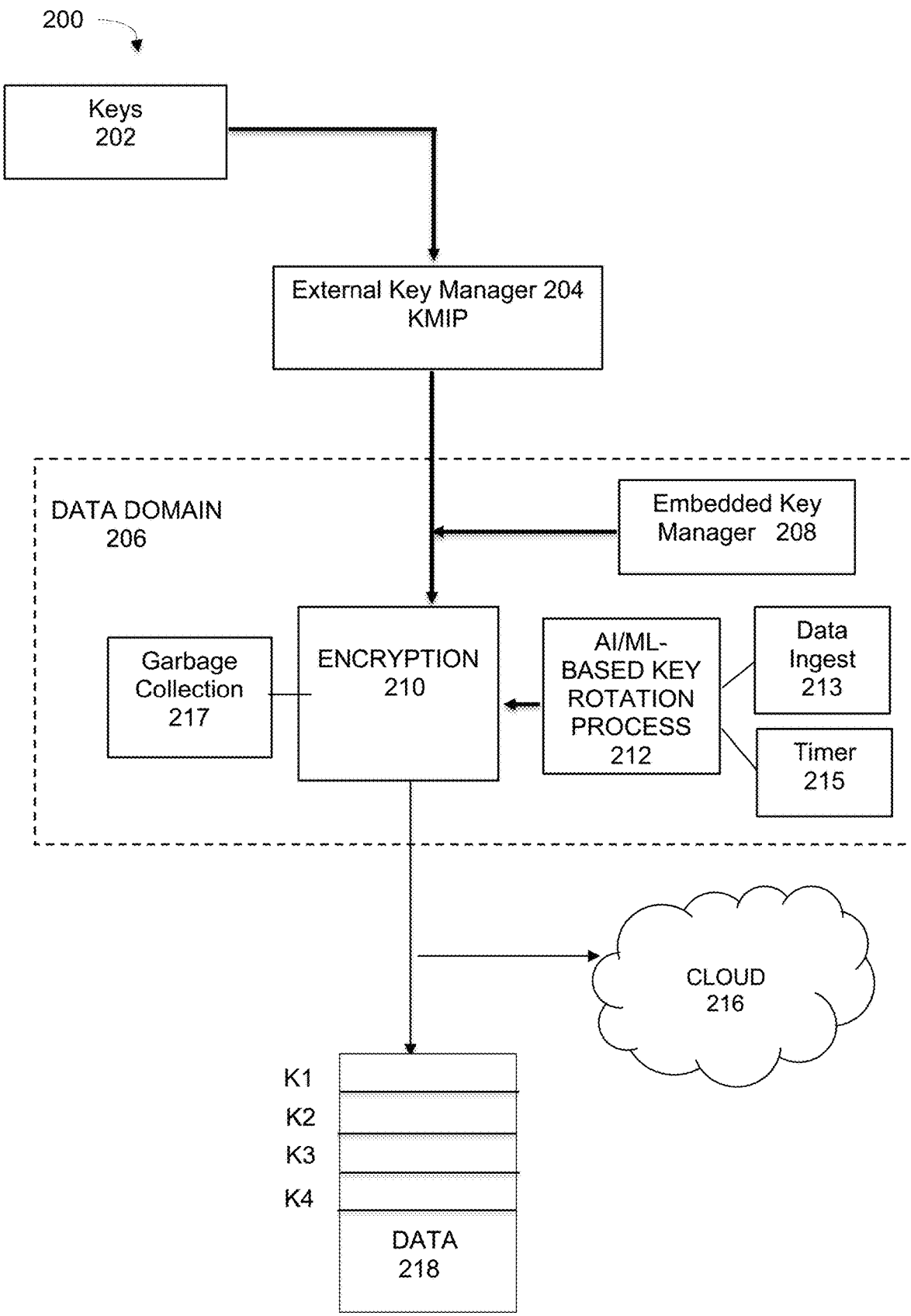
FIG. 2 illustrates the use of a key rotation process in conjunction with a Data Domain Deduplication system, under some embodiments.

FIG. 2 illustrates the use of a key rotation process in conjunction with a Data Domain Deduplication system, under some embodiments. Although embodiments are described with respect to Data Domain and DDFS systems, it should be noted that any other similar deduplication backup system can be used. As shown in system 200, the Data Domain system 206 includes a key manager and encryption process 210 which encrypts data 218 using keys K1, K2, . . . , Kn. The keys used by the key manager can be sourced externally or internally. For K3, K4, . . . example, keys 202 sourced externally can be sourced using a KMIP external key manager 204. Encryption keys are readily available from a number of key vendors, and most use the KMIP protocol, however, the external server housing the keys represents a point of vulnerability as a possible target for hackers and other system attacks. Some data storage systems utilize embedded or internal key sources. As shown in FIG. 2, encryption keys can come from an internal key manager or source 208. Regardless of source, the keys are used for data encryption by the key manager 210. The encrypted data 218 can be stored in local (active tier) storage or it can be stored in the cloud 216.

As stated above, in the case of encrypted data, if any key compromise situation occurs, data encrypted with a compromised key must be re-encrypted to ensure the integrity of the data. If large amounts of data are encrypted by a single key, this re-encryption process can take a long time. This is especially true of data stored in the cloud 218. In this case, re-encrypted hundreds of terabytes (TB) of data in the cloud tier can take on the order of several weeks or even months.

Embodiments of system 200 include a size-based key rotation process 212 that works with or is part of encryption process or subsystem 210. The key rotation process uses AI/ML techniques to predict when the threshold for rotating a key is going to be reached. This helps implement a rotation policy that tries to ensure that each chunk of data encrypted by a key is the same or nearly the same size as the other encrypted chunks to prevent any one key from encrypting an excessive amount of data. Thus, as shown in FIG. 2, the data 218 encrypted as data chunks by each of keys K1, K2, K3, and K4 should be equal or at least approximately equal to each other.

Some present systems use a scheduler process to periodically rotate their keys in a fixed time-based rotation scheme. One example is the cron command-line utility (cronjob), which is a job scheduler on Unix-like operating systems that allows users to schedule jobs (commands or scripts) to run periodically at fixed times or intervals. Using a mechanism like cronjob, a user would define the rotation interval (e.g., once a day, once a week, etc.) through an appropriate parameter definition (e.g., crontab). The system then attempts to rotate the key at the specified time interval, and if the rotation is a success, the next key rotation is performed at the time or date set in cronjob. However, if key rotation fails and the cronjob entry is not updated, then key rotation will simply stop from that time onwards. That is, at the time of automated key rotation failure, the key rotation process exits even when the next key rotation date is not successfully set. The previous key is used again continuously, thus leading to the potential problem of large amounts of data getting encrypted by a single key.

As shown in FIG. 1, and further described in FIG. 2, system 100 includes a size-based key rotation process 121 that is part of or accessed by the key management process 120 and that utilizes certain AI/ML techniques. Process 121 uses a predicted threshold value to rotate keys based on data ingestion rates, rather than simply based on time. Process 121 may also implement a time-based key rotation process as a backup in case a size-based key rotation process using a predicted threshold time fails or takes too long.

Figure 3:
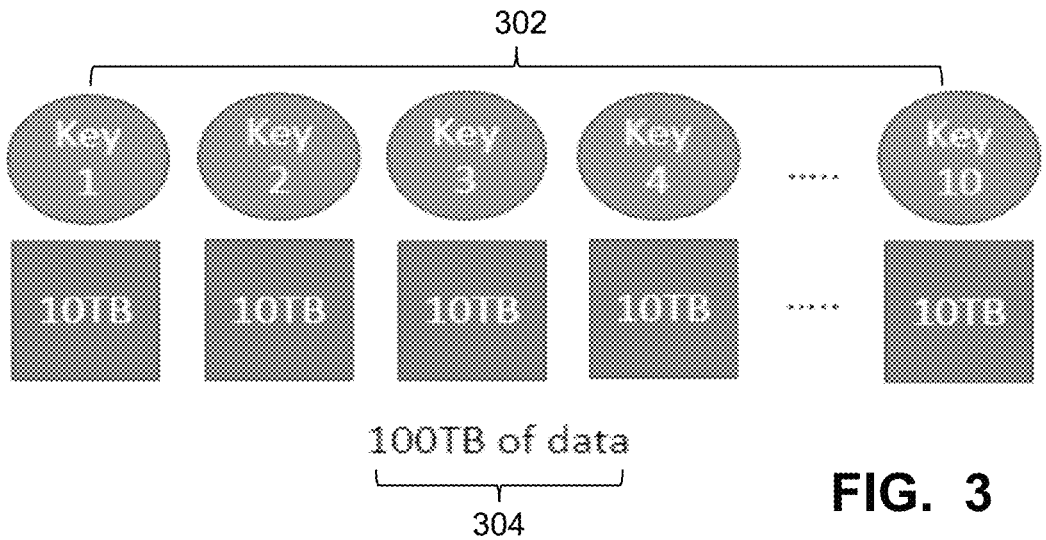
FIG. 3 illustrates operation of a key rotation process equalizing the amount of data encrypted by each key, under some embodiments.

FIG. 3 illustrates operation of a key rotation process equalizing the amount of data encrypted by each key, under some embodiments. As shown in FIG. 3, a 100 TB dataset 302 is to be encrypted by a number of keys. The dataset can be divided into chunks of any practical size, with each chunk encrypted by its own key. For the example of FIG. 3, the data 302 is divided into 10 chunks of 10 TB each, and each chunk is encrypted by a respective key 304 from key 1 to key 10. Any other appropriate division of the dataset 304 is also possible, such as quarters, fifths, and so on depending on system constraints and requirements.

Embodiments of system 100 use a key rotation scheme that is size-based, such that the amount of data encrypted and stored by each key is measured and keys are rotated when a certain amount of data is reached. Such a key rotation process 212 utilizes or includes a data ingest counter 213 to keep track of the amount of data gathered into each chunk and assigned for encryption by a key. Any relevant measure of data I/O can be used to measure size, such as the number of containers per key. For this method, the number of containers per key is counted and compared to a defined threshold value. When the amount of data (e.g., number of containers) exceeds the threshold, the key is rotated so that the next set of data is encrypted by a different key until its count reaches the threshold, and so on. In this manner, each set of data encrypted by a key should be the same or similar in size to any other dataset encrypted by other keys.

To trigger a key rotation, a threshold value is defined so that the encrypted dataset sizes remain similar. This threshold may be defined as a static or set variable, such as 5 TB or 10 TB, so that when a dataset of that size has been encrypted by a key, a new key is automatically rotated in. In some present systems, simply reaching the threshold data storage value constitutes the trigger that initiates key rotation. In an embodiment, the threshold is predicted using certain AI/ML techniques so that the system pre-execute or default execute a key rotation in anticipation of the size threshold being reached. For this embodiment, the prediction is made based on the rate of data ingestion. The system 100 thus measures the rate of data ingestion, which is then used to predict when the threshold will be reached to trigger the key rotation.

Figure 4:
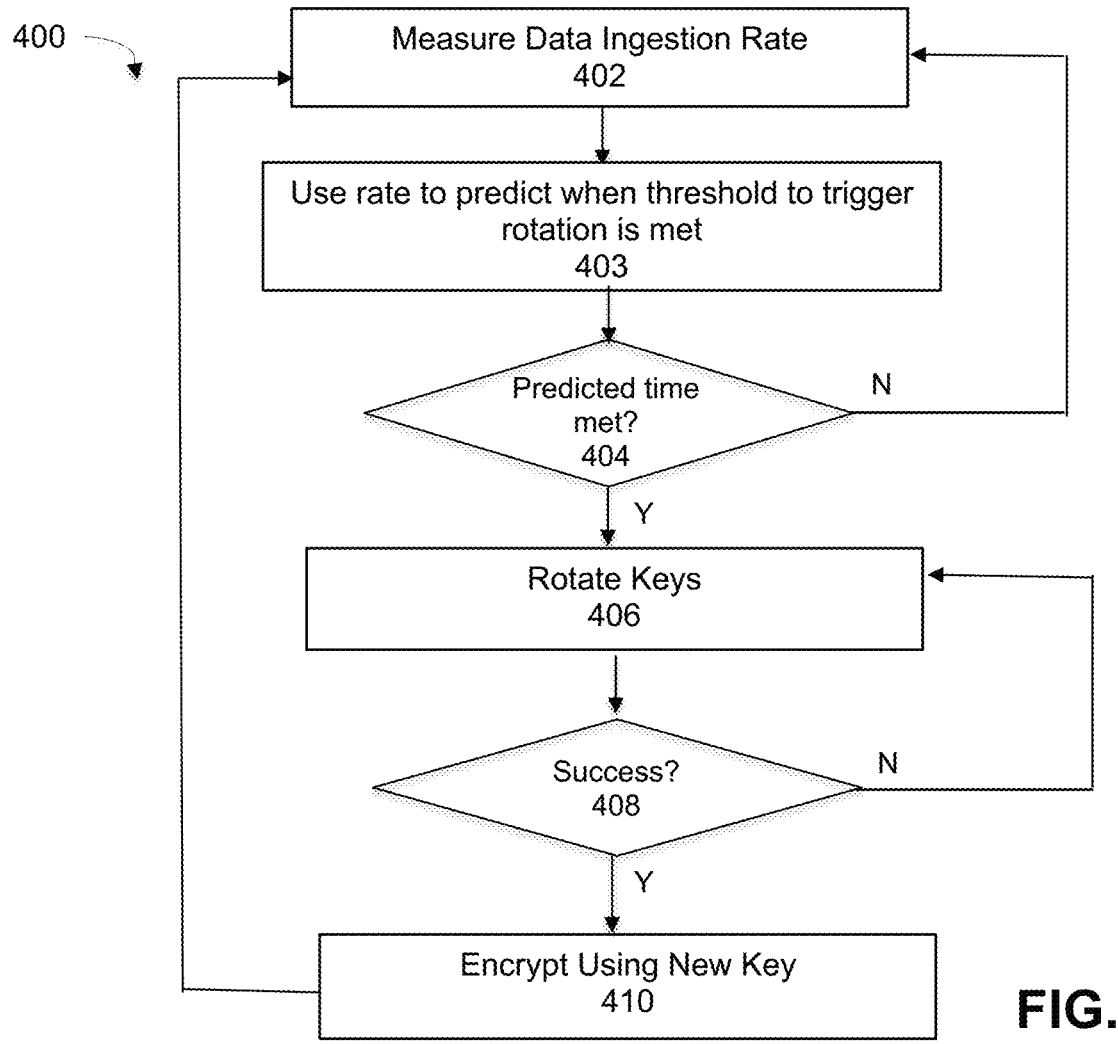
FIG. 4 is a flowchart illustrating a method of performing size-based key rotation using a predicted threshold time based on data ingest rates, under some embodiments.

FIG. 4 is a flowchart illustrating a method of using data ingest rates to predict a size threshold to trigger key rotation, under some embodiments. Process 400 begins by measuring the rate of data ingestion into the system for a set of data encrypted by a current encryption key, 402, such as by using the data ingest measurement process 213. Any appropriate measure of data ingestion rate may be used, such as storage device activity, read/write operations, network traffic, and so on. The amount of data ingestion per period of time corresponds to an amount of data encrypted by a respective key.

A threshold value for the size that is used trigger a key rotation is defined so that the same or similar amounts of data are encrypted by each rotated key. This threshold depends on the configuration of the system and may be on the order of 5 TB, 10 TB, or similar. So that, for example, when 5 TB of data is encrypted for storage by a key (K1), the key is rotated so that the next 5 TB of data is encrypted for storage by a next key (K2), and so on.

In step 403, the system uses the data ingestion rate to predict when the threshold size will be reached. The data ingestion rate is defined in terms of data amount per unit time (e.g., KB/s) encrypted for storage by a particular key. A high rate of data ingestion indicates that the threshold size will be reached relatively quickly, while a slow rate of data ingestion indicates that the threshold size will be reached slowly. Thus, fast data rates can be used to rotate keys more quickly or in advance based on the prediction as to when the key will encode the requisite amount of data. For example, assume that the threshold is 500 MB, and in the first week the system reaches 100 MB (based on calculation per unit time), and the second week is 400 MB, at the beginning of the third week, the threshold of 500 MB is already met 500 MB even though a logical analysis would lead one to think that it would take four weeks to reach the threshold. In this case, the rate of data ingestion in the second week is high and anticipates the fact that the threshold size is to be imminently reached during that period. The prediction thus represents a time when the defined threshold for the size-based key rotation will be met.

In step 404, the system determines if the predicted time based on the data ingestion rate has been met, the key rotation process rotates the keys so that the next set of data is encrypted by a different key, 406. The system next determines if the key rotation was a success 408, and if not it attempts key rotation again, 406. With respect to determination of success or failure, based on the API response, the system will determine if key rotation succeeded or failed. A key rotation failure typically causes the system to generate an alert signal through a user interface to notify the user or other system components that the keys have failed to rotate. If there is no such alert, the key rotation operation is deemed successful. Other similar mechanisms can also be used to test and differentiate rotation success or failure.

If the key rotation is successfully completed, the system then encrypts the next dataset with the new key, 410, and continues to measure the ingestion rate of this new data.

The amount of data encrypted and stored per key may be modified by setting different threshold values, and typical sizes of encrypted datasets may be on the order of 5 TB or 10 TB per key, or any other appropriate amount of data.

In many practical systems, the ingestion rate is constantly changing based on system usage, running applications, special events, fault conditions, and so on. The rate of data ingestion may thus vary quite a lot between different keys making it difficult to make predictions to capture similar amounts of data encrypted by each of these keys. In most systems, however, data ingestion rates conform to certain known patterns based on time-of-day or day-of-week usage, routine versus exception processing, and so on. Certain recognized data ingestion rates can thus indicate known amounts of data generated during a certain time period, such as data backups, application processes, routine transactions, and so. These patterns are then used to set threshold values that trigger key rotations so that the same size datasets are stored for each key. The threshold value used in step 404 of process 400 may thus vary for different keys, but the size-based key rotation process using predicted threshold triggering is configured to equalize the amount of data encrypted and stored for each key.

In an embodiment, the key rotation process incorporates certain AI/ML techniques to intelligently predict the when the threshold value will be reached based on the ingestion rate to tailor the rotation period for the different keys. For the above example in FIG. 3, the example 10 TB threshold is a static value. In an embodiment, AI/ML prediction is used to dynamically determine when this threshold will be met based on realistically changing data ingest rates. The time slot for when the key rotation will be performed will thus be predicted using AI/ML in advance of the rotation.

Different process loads in the system generally have at least have some, if not significant, effect on the data ingest rates. For example, if a large amount of data is ingested during a certain period of time, this indicates that the key should be rotated quickly as the data size threshold will be quickly met. Conversely, if the deduplication ratio is extremely high and data ingest rates are low, the system can rotate the key at a later point in time as the threshold will likely not be met for a while under heavy processing conditions.

The threshold value itself may be dynamically set to accommodate different load and ingestion rate conditions. For example, in a high-performance machine, if the system supports converting 100 TB of data in a day, the threshold can be set to 100 TB. In the case of small capacity systems like DDVE (Data Domain Virtual Edition), if the system supports just converting 5 TB of data in a day, this threshold can be set to 5 TB. Any other threshold value can be set based on system configuration and constraints. As an example of changing processing loads, if the garbage collection process 217 can finish the re-encryption of data sufficiently quickly, then the threshold value will increase, whereas any delay or additional data processing may cause the threshold to decrease.

The rate of data ingestion is a time-series problem, so various AI/ML models can be used to predict how much time a process (e.g., GC) will take to re-encrypt the data based on specific time periods (e.g., hour of day, day of week, etc.) for the user workload.

Figure 5:
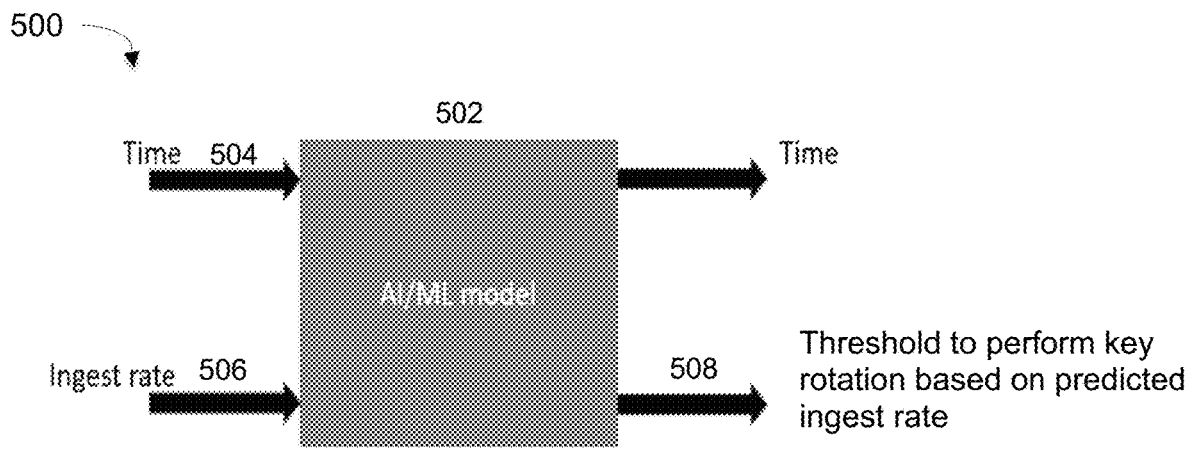
FIG. 5 illustrates an AI/ML-based threshold prediction scheme for size-based key rotation, under some embodiments.

FIG. 5 illustrates an AI/ML-based key rotation system for size-based encryption key rotation, under some embodiments. As shown in FIG. 5, system 500 comprises an AI/ML model 502 that takes as an input, the data ingestion rate 506 over time 504. The AI/ML model 502 is then used to determine the appropriate threshold value (for step 404 of process 400) to perform the key rotation (for step 406 of process 400). In system 500, the input to the AI/ML model 502 will be time series data with the ingest rate 506, and the output will be time series data along with a threshold value to perform key rotation.

As stated above, the threshold 508 is not a static value, but is instead dynamic, i.e., changeable over time. If it is observed that accuracy goes below a certain level on a validation set, this indicates that the pattern of usage has changed, and consequently that the AI/ML model 502 needs to be retrained. Such a case can arise when the user makes major changes in the system, such as headswap operations, underlying OS changes, upgrading to latest builds, and so on. Such changes mean that overall algorithms in filesystems are more efficient and optimized, and that ingest rates increase based on network throughput or changes in data patterns. Similarly, other events or actions may degrade the system, causing degradation or reduction in ingest rates, such as by throttling or de-prioritizing (e.g., through load-balancing) of the system. Thus, the AI/ML model 502 needs to be trained dynamically.

Figure 6:
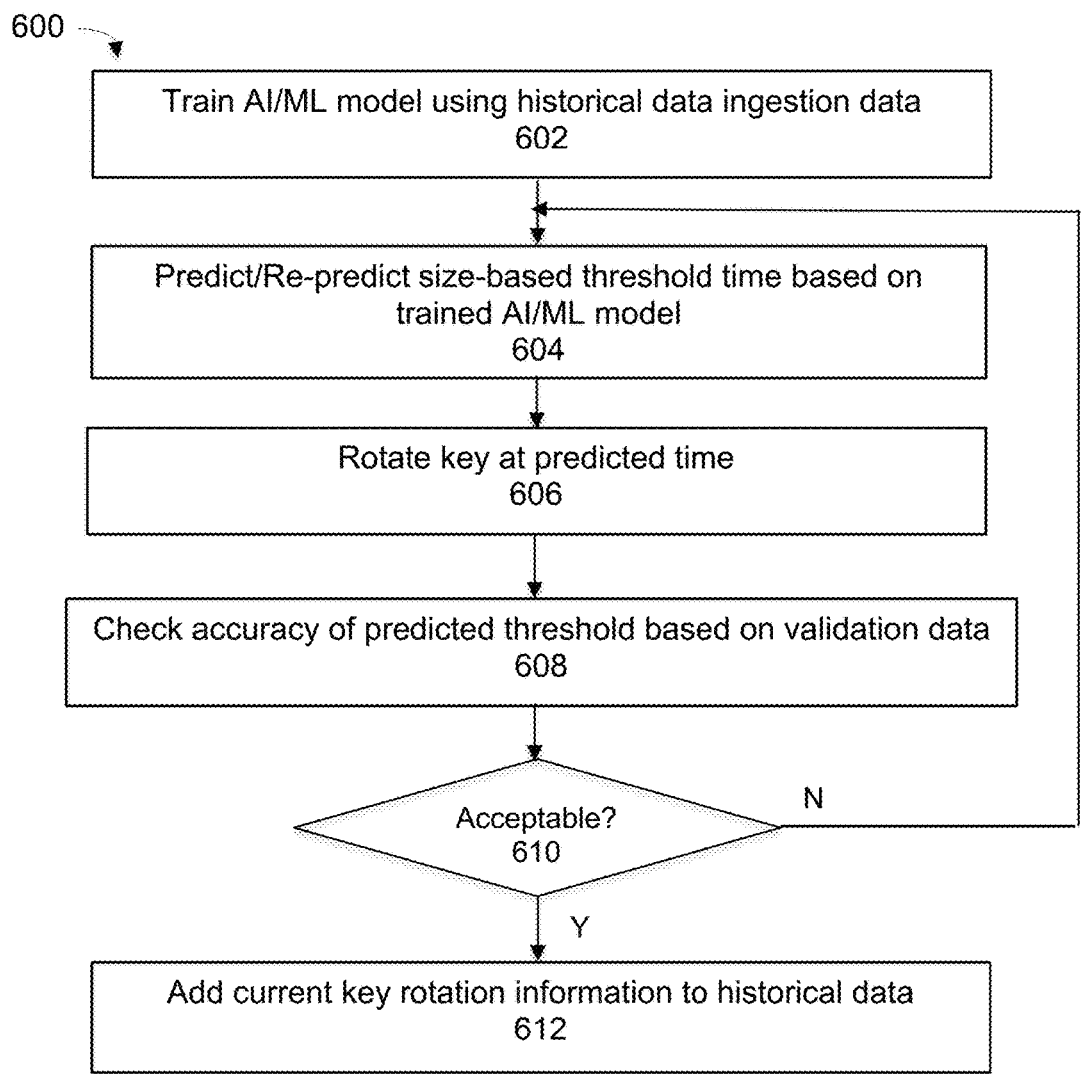
FIG. 6 is a flowchart that illustrates performing key rotation using a size-based rotation scheme using AI/ML processes, under some embodiments.

FIG. 6 is a flowchart that illustrates performing key rotation using a size-based rotation scheme using AI/ML processes, under some embodiments. The AI/ML model is trained using historical data ingestion rates. Such historical data may be compiled over a certain period of time and may comprise actual user from known system deployments and/or laboratory use cases. In addition, it may comprise data obtained through simulations or theoretical use cases.

As shown in FIG. 6, process 600 starts with training the AI/ML using historical data ingestion rates, 602. Using the trained model, the system predicts when the size-based threshold value to rotate the keys will be reached, 604. The system then performs the key rotation at the time predicted, 606.

In an embodiment, the system 500 can be configured to check the accuracy of the predicted time to reach the threshold based on validation tests or validation datasets, 608. The system can be configured to check if the requisite (threshold) amount of data was actually stored in the time predicted based on the data ingestion rate. If the accuracy is not acceptable 610, as compared to a defined accuracy threshold, the prediction can be adjusted by re-prediction 602, rotation and re-checking as necessary. The information of the current key rotation operation can then be added to the historical data for future model training, 612.

The system can automate the periodic key rotation based on regular threshold predictions of process 600. In this process, using the predicted threshold 604, the key is automatically rotated when the data associated with a particular encryption key reaches a threshold that is predicted by AI/ML processes. The frequency of threshold calculations to determine a new key rotation time may vary depending on system configuration and constraints. In general, it may be on the order of hourly, daily, weekly, etc., and may be set by a user or system parameter.

The data ingestion rate can be measured using any appropriate method. In an embodiment, the ingestion rate comprise the percentage time a data storage device is busy, i.e., "Disk Busy %" parameter, though any similar parameter may also be used. For example, instead of disk busy percentage, a number of read/write input/output operations per second (IOPS), or network traffic statistics, and so on, may be used.

In an embodiment, the disk busy percentage parameter is obtained in a system that provides certain disk performance data. For example, the Data Domain OS (DDOS) provides a platform independent disk performance data file (perf.log) that contains disk statistics collected every 5 minutes for an in-use disk. The statistics include Disk Busy %, read IOPS, write IOPS, disk names, and so on. Other similar systems may also be used, and that may include the same or similar system usage parameters.

Figure 7:
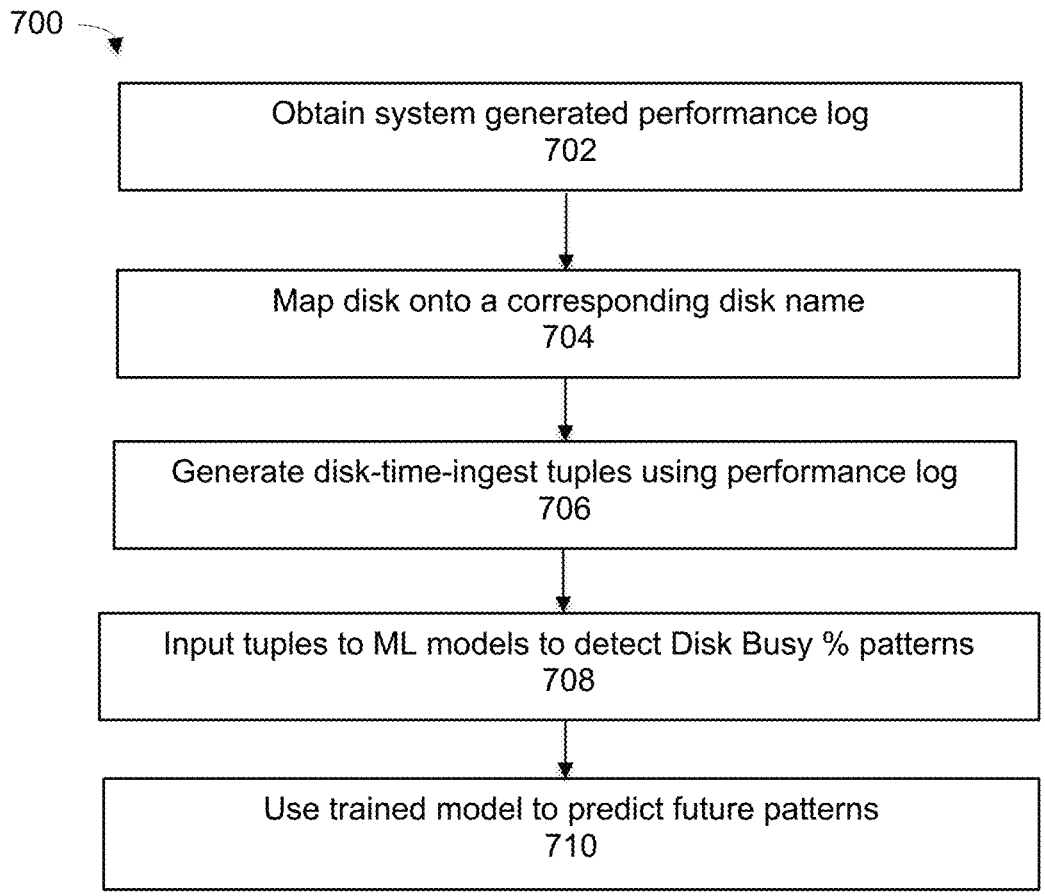
FIG. 7 is a flowchart that illustrates a process for training the AI/ML model for size-based key rotation, under some embodiments.

As shown for process 600, a first step 602 is to train the AI/ML model 502 using the historical data ingestion data. FIG. 7 is a flowchart that illustrates a process for training the AI/ML model for size-based key rotation, under some embodiments. As shown in FIG. 7, process 700 starts with obtaining the system generated performance log, or equivalent operational/performance information for a relevant parameter, such as disk busy, IOPS, traffic, and so on, 702. The performance log may thus include different usage patterns and data for different aspects of system operation.

In an embodiment, the relevant parameter provided by the performance log is the Disk Busy %. For this embodiment the process maps the relevant disk onto a corresponding disk name, 704. The disk may be any appropriate type that is read from and/or written to with respect to the encrypted data. For example, the disk may be an SSD (solid-state disk), HDD (hard disk), or any other appropriate type of storage device. For an embodiment using an SSD, the process involves mapping the SSD disk into a disk name, such as "sdo."

Using the performance log, the system generates a set of tuples of the following format: <disk_name, timestamp, ingest_rate (disk busy %)>, 706. For example, a tuple may be expressed as: <SSD_disk_name, time, ingest_rate>. For the timestamp, the process may take user or system times and convert them to epoch time for use in certain ML models.

The tuples are then input to one or more different ML algorithms to detect patterns with respect to the Disk Busy % parameter, 708.

In step 710, process 700 uses the trained model to predict future disk busy percentage patterns, and subsequently validate them.

With respect to the pattern detection step 708, various different models may be used. For example, to detect if a pattern exists at all between time and the Disk Busy %, a clustering program, such as K-means clustering on a usage spanning a certain usage cycle (e.g., 7 days) can be used. Various different values of K can be used as experiments. For example, in such a 7-day usage cycle, backups usually take place on weekend, so that disk busy times (ingestion rates) tend to be higher on weekends than on weekdays.

Any appropriate model can be used, such as linear regression, random forests, long short-term memory (LSTM), and so on. Linear regression is based on a straight line relationship, while random forests are based on decision trees that try to average out results by forming various smaller decision trees. LSTM is a type of recurrent neural network (RNN) that connects previous information to a present task. Traditional RNN has a problem of the exploding or vanishing gradient making it a challenge to find the long-term dependencies of the past and present. LSTM overcomes this problem by having the cell, an input gate, an output gate, and a forget gate. The cell remembers the value of the time interval and the gates control how the information should go into and out of the cell. LSTM is suitable for learning about a trend and make predictions for time series data.

In an embodiment, LSTM is selected as the model for use with system 500 and process 600, though embodiments are not so limited. LSTM has been found to be best suited for time series analysis in certain applications, and LSTM is used in system 100 to make accurate predictions.

With respect to the dynamic training model, as shown in FIG. 6, process 600 includes a validation operation that is used to check the accuracy of a predicted threshold. If it is observed that accuracy goes below a threshold that is deemed or defined to be acceptable, this indicates that a pattern of usage or system configuration/integrity has changed, and that the model needs to be retrained. As mentioned above, such an event can occur if a user performs a headswap (e.g., from mid-range to high-end platform), upgrades to latest builds so that Garbage Collection (GC) algorithms are more efficient and optimized, changing network throughput to increase ingest rates, and so on. The model thus needs to be trained dynamically.

In an embodiment the "accuracy" of the threshold prediction here is determined based on boundaries. For example, if the user wants to perform encryption key rotation on 10 TB data size, it can provide boundaries with 25 percent error rate. Thus, the system will perform encryption key rotation only when size of the data is greater than 7.5 TB and less than 12.5 TB. If the AI/ML model predicts encryption key rotation beyond this boundary, then it will not be performed, and this is an indication that there is a major change in user or system setup. This can be captured in auto support whenever an AI/ML model prediction goes beyond the boundary.

In an embodiment, the system can maintain a counter as part of an auto-support system to indicate how many times an AI/ML model prediction went beyond the boundary. If this counter reaches a specific threshold, it will then retrain the model, as this condition is an indication that an AI/ML model is not performing well. The system can also log the parameters for which model did not perform well, which will help in analyzing which specific parameters contributed to the model failure.

Figure 8:
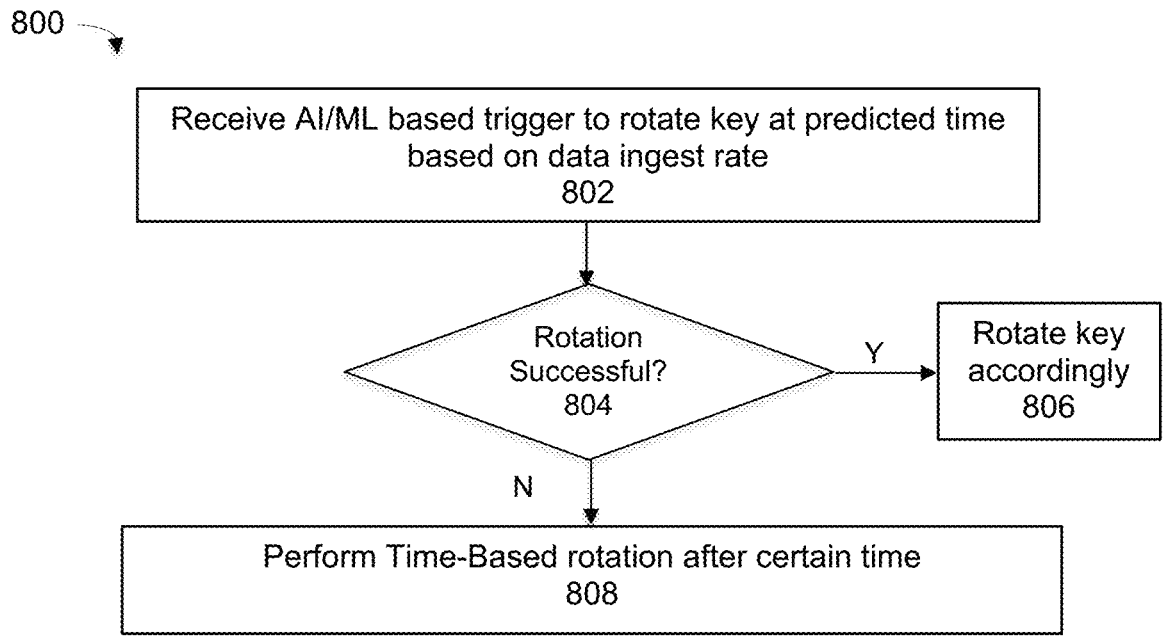
FIG. 8 illustrates a key rotation process using time-based rotation as a backup to size-based rotation, under some embodiments.

In an embodiment, system 200 also includes a time-based rotation process as a supplemental rotation scheme when size-based key rotation is not set, or if it fails for some reason. FIG. 8 illustrates a key rotation process using time-based rotation as a backup to size-based rotation, under some embodiments. As shown in FIG. 8, process 800 starts with the system receiving an AI/ML based trigger to rotate the key at the predicted time based on the data ingest rate, 802. In step 804, it is determined whether or not the rotation is successful. If so, the key is rotated accordingly, 806. If, however, the key rotation is not successful, the system performs a key rotation upon reaching a certain period of time, such as one day, one week, or similar defined period, 808. Thus, if the user or system has set time based key rotation, then the key rotation will be tried at the next day (or other time period) if key rotation fails for any reason on a particular day.

In an embodiment, there may be a default automatic time-based key rotation in any event. For this embodiment, a relatively long period (e.g., 3 months) may be set to trigger the key rotation even if the AI/ML size-based rotation is active. This helps to improve security of the overall storage system in case of key compromise/destroy events, as limited amount of data will be encrypted using a single key, and this amount of data (threshold) that will be predicted using AI/ML will trigger most efficient key rotation events.

Embodiments incorporate AI/ML approached into key rotation processes based on the characteristics of data and storage sub-systems to trigger most efficient key rotation events in order to keep compromised key event processing times similar across data encryption keys. The size based key rotation will ensure that each key will encrypt nearly equal amounts of data, as shown in FIG. 3. If each key encrypts a limited amount of data in this manner, it then helps in re-encryption of the data in case of key compromise or destruction events.

Embodiments of the processes and techniques described above can be implemented on any appropriate data storage or backup system operating environment or file system, or network server system. Such embodiments may include other or alternative data structures or definitions as needed or appropriate.

Figure 9:
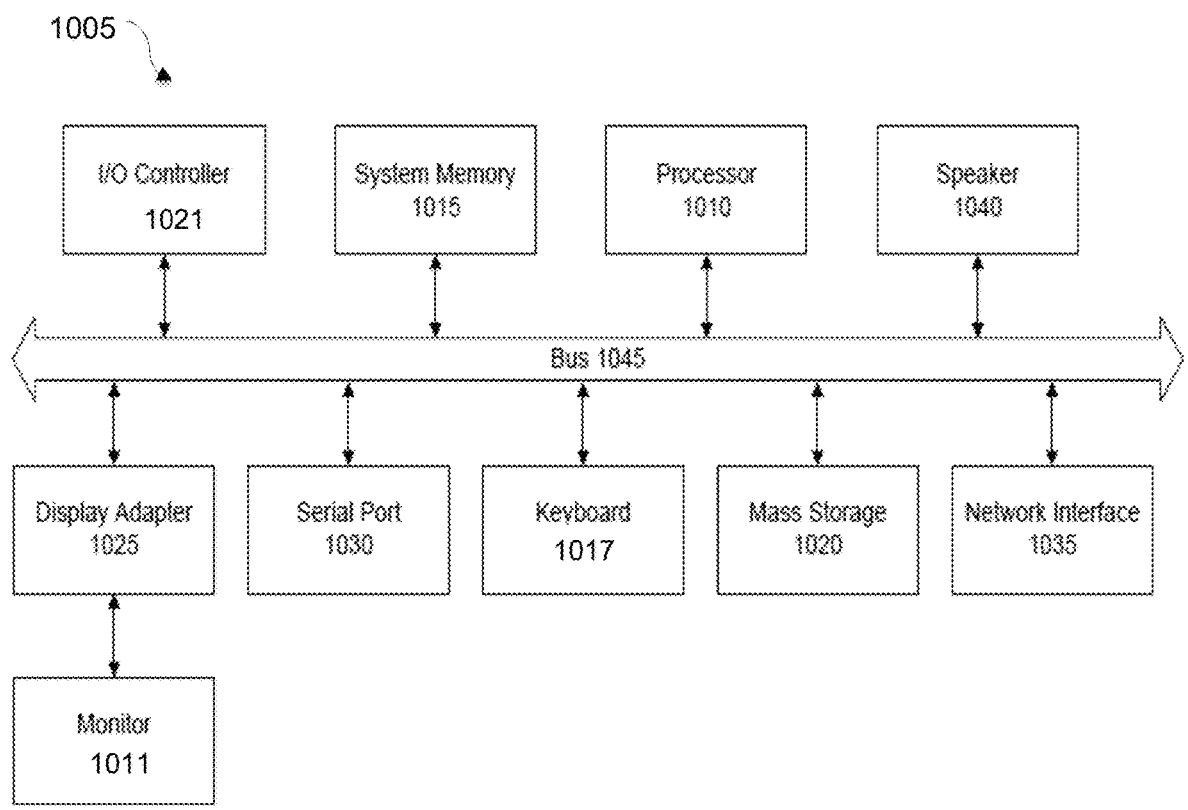
FIG. 9 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of rotating encryption keys in a data storage system, comprising:
    defining a threshold value setting an amount of data to be encrypted by a single encryption key, wherein the threshold value relates to a maximum amount of data to be encrypted by the current encryption key for storage in the data storage system;
    measuring a data ingestion rate corresponding to a rate of data transmitted to or from a storage device through read/write input/output operations per second (IOPS), and wherein the current data ingestion rate comprises a percentage amount of time the storage device is busy during a defined time period and comprising a disk busy percentage parameter;
    predicting a time that the threshold value will be met based on the data ingestion rate; and
    performing a key rotation operation at the predicted time to use a new key to encrypt incoming data.

2. The method of claim 1 wherein the predicting step uses a machine learning (ML) model trained using historical data ingestion rates of the data storage system.

3. The method of claim 2 wherein the threshold value is expressed in terms of dataset size encrypted by a respective encryption key for storage in the data storage system.

4. The method of claim 2 further comprising:
    dynamically training the ML model based on updated system usage; and
    checking an accuracy of the predicted time using validation data based on an actual time that the threshold was met.

5. The method of claim 4 further comprising, if the accuracy is less than a defined accuracy threshold, re-predicting the time using the dynamically trained ML model.

6. The method of claim 1 wherein the disk busy percentage parameter is obtained by the data storage system through a performance log file containing data use statistics compiled periodically during usage of the storage device and representing time series data for use by the ML model.

7. The method of claim 6 wherein the storage device comprises one of a solid state drive (SSD) device and a hard disk drive (HDD), the method further comprising:
    mapping the storage device to a disk name;
    generating, using the performance log file, a plurality of tuples for the predicting step; and
    providing the tuples to train a machine learning algorithm to detect patterns in the tuples by processing the time series data.

8. The method of claim 7 wherein each tuple of the plurality of tuples comprises a three-part data element including the disk name, a timestamp, and a data ingestion rate at the time of the timestamp and representing a corresponding disk busy percentage value.

9. The method of claim 7 wherein the machine learning algorithm comprises a long short-term memory algorithm that comprises a recurrent neural network process that uses a cell, an input gate, an output gate, and a forget gate.

10. The method of claim 1 further comprising:
    determining if the key rotation operation is successful in rotating to the new key from an old key; and
    rotating the key automatically after a defined period of time.

11. The method of claim 1 wherein the encryption key is provided to a key manager component by one of an external key source utilizing a Key Management Interoperability Protocol (KMIP) or an embedded key source within the data storage system, and wherein the data storage system comprises part of a deduplication backup process executed by a data storage server running a Data Domain file system (DDFS).

12. A computer-implemented method of rotating encryption keys in a data storage system, comprising:
    training a machine learning (ML) model based on historical data of data ingestion rates in the data storage system, wherein the data ingestion rates each measure a rate of data transmitted to or from a storage device through read/write input/output operations per second (IOPS), and wherein the current data ingestion rate comprises a percentage amount of time the storage device is busy during a defined time period and comprising a disk busy percentage parameter;
    predicting a time to reach a threshold amount of encrypted data using the trained model, the threshold amount relates to a maximum amount of data to be encrypted by the current encryption key for storage in the data storage system; and
    determining whether or the predicted time has passed, and if so, performing a key rotation operation to use a new key to encrypt incoming future data.

13. The method of claim 12 wherein the disk busy percentage parameter is obtained by the data storage system through a performance log file containing data use statistics compiled periodically during usage of the storage device and representing time series data for use by the ML model.

14. The method of claim 13 wherein the storage device comprises one of a solid state drive (SSD) device and a hard disk drive (HDD), the method further comprising:
    mapping the storage device to a disk name;
    generating, using the performance log file, a plurality of tuples for the predicting step; and
    providing the tuples to train a machine learning algorithm to detect patterns in the tuples by processing the time series data, wherein each tuple of the plurality of tuples comprises a three-part data element including the disk name, a timestamp, and a data ingestion rate at the time of the timestamp and representing a corresponding disk busy percentage value.

15. The method of claim 14 wherein the machine learning algorithm comprises a long short-term memory algorithm that comprises a recurrent neural network process that uses a cell, an input gate, an output gate, and a forget gate, and further comprising:
    dynamically training the ML model based on updated system usage;
    checking an accuracy of the predicted threshold value using a validation data set to detect changes in system usage; and
    re-predicting, if the accuracy is less than a defined accuracy threshold, the threshold using the dynamically trained ML model.

16. A method of rotating encryption keys encrypting respective chunks of data in a data storage system comprising:
    implementing a size-based key rotation process rotating keys in accordance with maximum encrypted dataset set size as a threshold value;
    automatically triggering the key rotation process based on a predicted time to reach the threshold value, wherein the predicted time is predicted using a trained machine learning (ML) algorithm using historical and present data ingestion rates; and
    further triggering the key rotation after a defined time period if the automatic triggering does not occur within the defined time period; wherein a data ingestion rate measures a rate of data transmitted to or from a storage device through read/write input/output operations per second (IOPS), and wherein the current data ingestion rate comprises a percentage amount of time the storage device is busy during a defined time period and comprising a disk busy percentage parameter, and further wherein the disk busy percentage parameter is obtained by the data storage system through a performance log file containing data use statistics compiled periodically during usage of the storage device and representing time series data for use by the ML algorithm.

* * * * *